United States Patent
Xiao et al.

(10) Patent No.: US 9,497,044 B2
(45) Date of Patent: Nov. 15, 2016

(54) SYSTEM FOR AND METHOD OF CALL TRANSFER MANAGEMENT

(75) Inventors: Hong Xiao, Acton, MA (US);
Dongchen Wang, Concord, MA (US);
Andre Turner, Belmont, MA (US);
Changqing Wang, Acton, MA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 711 days.

(21) Appl. No.: 13/167,411

(22) Filed: Jun. 23, 2011

(65) Prior Publication Data

US 2012/0327812 A1    Dec. 27, 2012

(51) Int. Cl.
| | |
|---|---|
| *H04M 3/42* | (2006.01) |
| *H04L 12/66* | (2006.01) |
| *H04L 29/06* | (2006.01) |
| *H04M 3/54* | (2006.01) |
| *H04W 4/16* | (2009.01) |
| *H04W 76/04* | (2009.01) |

(52) U.S. Cl.
CPC ........... *H04L 12/66* (2013.01); *H04L 65/1096* (2013.01); *H04M 3/548* (2013.01); *H04M 3/543* (2013.01); *H04M 2250/02* (2013.01); *H04W 4/16* (2013.01); *H04W 76/041* (2013.01)

(58) Field of Classification Search
CPC ......... H04W 4/12; H04W 4/16; H04W 8/18; H04W 12/06; H04W 8/22; H04W 12/08; H04W 4/003; H04W 4/14; H04W 4/20
USPC ............. 370/352, 348, 379, 201.01, 218.01, 370/259; 455/418, 416, 417, 419, 420, 415; 379/207.16, 211.01, 211.02, 211.04
See application file for complete search history.

(56) References Cited

U.S. PATENT DOCUMENTS

| | | | | |
|---|---|---|---|---|
| 6,496,578 | B1 * | 12/2002 | Chen et al. | 379/211.02 |
| 7,277,697 | B2 * | 10/2007 | Desai et al. | 455/416 |
| 7,499,729 | B2 * | 3/2009 | Lie et al. | 455/565 |
| 7,747,265 | B1 * | 6/2010 | Ruf | 455/466 |
| 7,769,392 | B2 * | 8/2010 | Russell | 455/456.1 |
| 7,876,888 | B2 * | 1/2011 | Chatterjee et al. | 379/201.01 |
| 8,295,462 | B2 * | 10/2012 | Miller et al. | 379/202.01 |
| 8,301,130 | B1 * | 10/2012 | Gunasekara et al. | 455/418 |

FOREIGN PATENT DOCUMENTS

EP    1032224 A2 *  8/2000 ............. H04Q 7/24

* cited by examiner

*Primary Examiner* — Dang Ton
*Assistant Examiner* — Sai Aung

(57) ABSTRACT

A system for and method of call transfer management may include receiving a phone call over a landline, receiving, using a device connected to the landline, a wireless signal from a mobile device indicating a call transfer request, wherein the call transfer request contains a mobile device indicator, determining, using the device connected to the landline, that the phone call over the landline will be transferred to the mobile device, wherein the determination is made at least in part on the receipt of the call transfer request, sending, from the device connected to the landline, a call transfer request over the landline, wherein the call transfer request contains a mobile device indicator of the mobile device, and transferring the phone call from the landline to the mobile device.

20 Claims, 5 Drawing Sheets

SYSTEM FOR AND METHOD OF CALL TRANSFER MANAGEMENT

BACKGROUND INFORMATION

Calls to landline based phones face several disadvantages not present in calls to mobile devices. The mobility of landline based calls is limited compared to mobile devices. Additionally, landlines may have multiple extensions, and privacy during a call may be impeded by another individual picking up an extension. However, transferring calls from a landline to a mobile device is too cumbersome and disruptive and may not be an option for resolving the disadvantages of a landline call.

BRIEF DESCRIPTION OF THE DRAWINGS

The present invention, together with further objects and advantages, may best be understood by reference to the following description taken in conjunction with the accompanying drawings, in the several figures of which like reference numerals identify like elements, and in which.

DETAILED DESCRIPTION OF PREFERRED EMBODIMENTS

According to some embodiments, call transfer management may include receiving, by a network device connected to a landline, an indication that a call on the landline should be transferred to a mobile device. An indication may be received from a mobile device and may be a request to transfer a call on a landline to the mobile device. According to some embodiments, a network device connected to a landline may detect a call on the landline and may apply rules to determine whether a call should be transferred to a mobile device.

According to one or more embodiments, the method may include receiving a phone call over a landline and determining, using a device connected to the landline, that the phone call over the landline should be transferred to a mobile device. The method may include sending, from the device connected to the landline, a call transfer request over the landline, wherein the call transfer request contains a mobile device indicator of the mobile device. The method may also include transferring the phone call from the landline to the mobile device.

Figure 1:
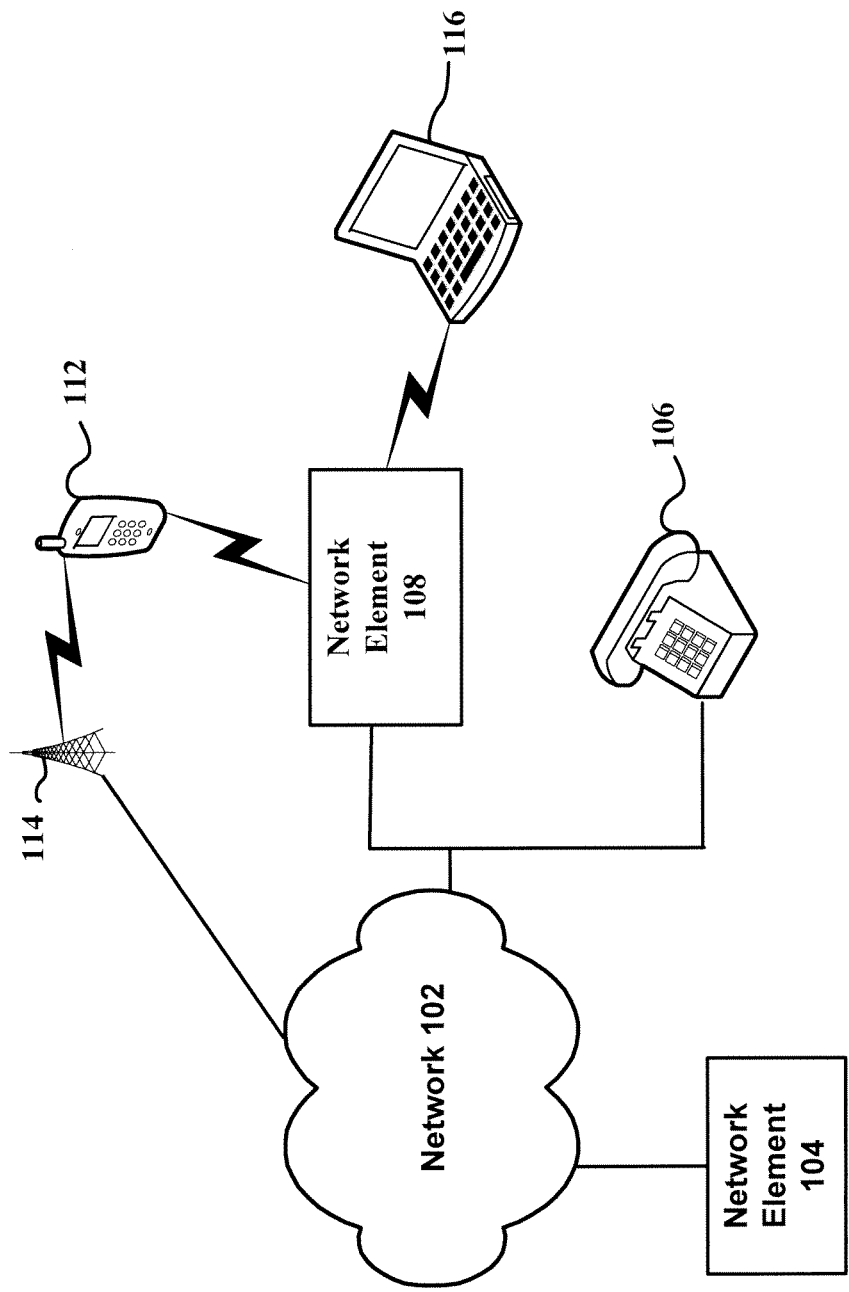
FIG. 1 is a schematic diagram illustrating a system for call transfer management, according to a particular embodiment.

FIG. 1 is a schematic diagram illustrating a system for call transfer management, according to a particular embodiment. As illustrated, network 102 may be communicatively coupled with one or more devices including network element 104 and network element 108. Other devices may communicate with network 102 via one or more intermediary devices, such as wireless device 112 via transmitter/receivers 114. One or more devices may communicate with network element 108 such as, for example, wireless device 112 and network client 116. According to some embodiments, telephone 106 may be a phone connected via a landline using a POTS (Plain Old Telephone System) based connection, a VOIP (Voice Over IP) based connection, or another telecommunications protocol.

The description below describes network elements, computers, and components of a system of and method for call transfer management that may include one or more modules. As used herein, the term "module" may be understood to refer to computing software, firmware, hardware, and various combinations thereof. Modules however are not to be interpreted as software which is not implemented on hardware, firmware, or recorded on a processor readable recordable storage medium (i.e., modules are not software per se). It is noted that the modules are exemplary. The modules may be combined, integrated, separated, and duplicated to support various applications. Also, a function described herein as being performed at a particular module may be performed at one or more other modules and by one or more other devices instead of or in addition to the function performed at the particular module. Further, the modules may be implemented across multiple devices and other components local or remote to one another. Additionally, the modules may be moved from one device and added to another device, and may be included in both devices.

Network 102 may include, for example, one or more of a fiber optics network, a passive optical network, a cable network, a Public Switched Telephone Network (PSTN), a wireless LAN, Wi-Fi, IEEE 802.11a, 802.11b, 802.15.1, 802.11n and 802.11g or any other wired or wireless network for transmitting and receiving a data signal. In addition, network 102 may include, without limitation, telephone line, fiber optics, IEEE Ethernet 802.3, a Wide Area Network ("WAN"), a Local Area Network ("LAN"), or a global network such as the Internet. Also, network 102 may support, an Internet network, a wireless communication network, a cellular network, or the like, or any combination thereof. Network 102 may further include one, or any number of the exemplary types of networks mentioned above operating as a stand-alone network or in cooperation with each other. Network 102 may utilize one or more protocols of one or more network elements to which it is communicatively coupled. Network 102 may translate to or from other protocols to one or more protocols of network devices. Although network 102 is depicted as a single network, it should be appreciated that according to one or more embodiments, network 102 may comprise a plurality of interconnected networks, such as, for example, a service provider network, the Internet, a broadcaster's network, a cable television network, a corporate network, and a home network.

Network elements 104 and 108 may transmit and receive data to and from network 102 such as, for example, VOIP data, videoconferencing data, multimedia data, and other data. The data may be transmitted and received utilizing a standard telecommunications protocol or a standard networking protocol. For example, one embodiment may utilize Signaling System Number 7 (SS7). In other embodiments, the data may be transmitted and received utilizing Session Initiation Protocol ("SIP") or H.323. In yet other embodiments, data may also be transmitted and received using Wireless Application Protocol ("WAP"), Multimedia Messaging Service ("MMS"), Enhanced Messaging Service ("EMS"), Short Message Service ("SMS"), Global System for Mobile Communications ("GSM") based systems, Code Division Multiple Access ("CDMA") based systems, Transmission Control Protocol/Internet ("TCP/IP") Protocols, or other protocols and systems suitable for transmitting and receiving broadcast or parallel search data. Data may be transmitted and received wirelessly or may utilize cabled network or telecom connections such as an Ethernet RJ45/Category 5 Ethernet connection, a fiber connection, a traditional phone wireline connection, a cable connection or other wired network connection. Network 102 may use standard wireless protocols such as, for example, II-EE 802.11a, 802.11b 802.11g, and 802.11n. Network 102 may also use protocols for a wired connection, such as IEEE Ethernet 802.3.

Wireless device 112 may communicate with network 102 via transmitter/receiver 114. Transmitter/receiver 114 may be a repeater, microwave antenna, cellular tower, or other network access device capable of providing connectivity between to different network mediums. Transmitter/receiver 114 may be capable of sending or receiving signals via a mobile network, a paging network, a cellular network, a satellite network or a radio network. Transmitter/receiver 114 may provide connectivity to one or more wired networks and may be capable of receiving signals on one medium such as a wired network and transmitting the received signals on a second medium such as a wireless network. Wireless device 112 may contain a module (e.g., a software based agent) which may accept user input from a button, a function key, a voice command, or other control for initiating a call transfer request.

Wireless device 112 may be a wireline phone, a cellular phone, a mobile phone, a satellite phone, a Personal Digital Assistants (PDA), a computer, a handheld MP3 player, a handheld video player, a personal media player, a gaming devices, or other devices capable of communicating with network 102 via transmitter/receivers 114. According to some embodiments, wireless device 112 may be use Voice Over IP ("VOIP") to provide one or more services.

Network client 116 may be desktop computers, a laptop computers, servers, personal digital assistants, or other computers capable of sending and receiving network signals. Network client 116 may use a wired or wireless connection. In one or more embodiments, network client 116 may connect directly to network 102 or via other network connectivity devices. Network client 116 may use WiFi, Bluetooth, Zigbee, or other wireless protocols for connectivity. According to one or more embodiments, network client 116 using a wireless connection may authenticate with a network using Wired Equivalent Privacy, Wi-Fi Protected Access or other wireless network security standards.

Network elements 104 and 108 may include one or more processors for recording, transmitting, receiving, and storing data. Although network elements are depicted as individual elements, it should be appreciated that the contents of one or more of a network elements may be combined into fewer or greater numbers of devices and may be connected to additional devices not depicted in FIG. 1. Furthermore, the one or more devices may be local, remote, or a combination thereof to a network element.

Network elements 104 and 108 may be one or more servers (or server-like devices). Network elements 104 and 108 may include one or more processors for recording, transmitting, receiving, and storing data. Network elements 104 and 108 may be servers of a service provider, the Internet, a broadcaster, a cable television network, or another media provider. According to some embodiments network element 104 may be a residential gateway, a router, a server, or other network infrastructure. According to some embodiments, network elements 104 and 108 may be servers which may provide different call transfer processing services.

Network elements 104 and 108 may provide Application Programming Interfaces ("APIs"), interface tables, Remote Procedure Calls ("RPCs"), web services, Extensible Markup Language ("XML") based interfaces, Simple Object Access Protocol ("SOAP") based interfaces, Common Object Request Broker Architecture ("CORBA") and other interfaces for sending or receiving media searches, preferences or other information.

According to one or more embodiments, network element 108 may contain one or more interfaces for connectivity to a landline such as, for example, an RJ-11 jack. Network element 108 may be connected as one extension of a plurality of extensions of a landline. According to some embodiments, network element 108 may contain an incoming RJ-11 jack and an outgoing RJ-11 jack allowing network element 108 to be plugged into a landline extension and allowing a phone plugged into network element 108 to make, receive, and terminate calls. Network element 108 may also provide wireless connectivity via WiFi, Bluetooth, Zigbee, or other wireless protocols. Network element 108 may contain or access storage (e.g., one or more databases of call routing rules, user preferences, known callers, user mobile device information, etc.). According to some embodiments, network element 108 may be configured to receive and send wireless signals and to send call management signaling over a landline. According to some embodiments, network element 108 may provide network connectivity to network 102 for wireless device 112 and network client 116. Network clients using a wireless connection to network element 108 may authenticate with a network using Wired Equivalent Privacy, Wi-Fi Protected Access or other wireless network security standards. Network element 108 may have a display capable of providing one or more of call information, transfer status information, and configuration information.

According to some embodiments, network element 104 may be a switch capable of receiving a request to transfer a telephone call and performing a call transfer. Network element 104 may be located at a telephone exchange or central office.

The various components of system 100 as shown in FIG. 1 may be further duplicated, combined and integrated to support various applications and platforms. Additional elements may also be implemented in the systems described above to support various applications.

Figure 2:
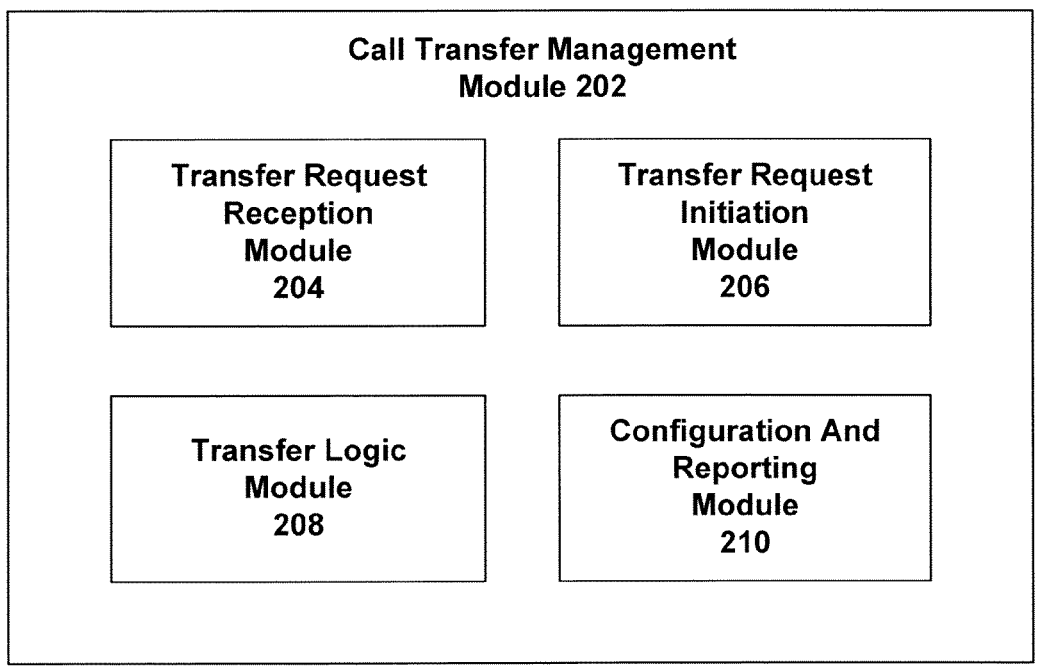
FIG. 2 is a block diagram of a module for performing call transfer management, according to a particular embodiment.

FIG. 2 is a block diagram of a module for performing call transfer management, according to a particular embodiment. As illustrated, the call transfer management module 202 may contain one or more components including transfer request reception module 204, transfer request initiation module 206, transfer logic module 208, and configuration and reporting module 210. Although call transfer management module 202 is depicted as a single module, functionality or modules of call transfer management module 202 may be located on a single device or distributed across a plurality of devices including one or more centralized servers and one or more end user devices.

Transfer request reception module 204 may receive one or more call transfer requests. According to some embodiments, transfer request reception module 204 may use wireless technologies to receive a transfer request from one or more devices such as, for example, wireless device 112 and network client 116 of FIG. 1. According to some embodiments, transfer request reception module 204 may receive a transfer request via a wired connection.

Transfer request initiation module 206 may forward one or more requests for a call transfer to a switch or other network element for a call on a landline. For example, network element 104 of FIG. 1 may be a switch located at a central office and transfer request initiation module 206 may forward a transfer request to network element 104. According to some embodiments, transfer request initiation module 206 may be implemented in a device connected to a landline. For example, transfer request initiation module 206 may be implemented in network element 108 of FIG. 1 and network element 108 may be connected to a landline. Transfer request initiation module 206 may forward a transfer request for a call to telephone 106. Transfer request initiation module 206 may receive an indication that a transfer request should be initiated from transfer request reception module 204. According to some embodiments, transfer request initiation module 206 may receive a request for initiation of a transfer from transfer logic module 208.

Transfer logic module 208 may contain one or more rules for determining whether a call should be transferred. According to some embodiments, transfer requests may be received at a network element connected to a landline from wireless devices. If a wireless device is authenticated to a network element this may be sufficient to allow a transfer request to proceed. For example, network element 108 may require authentication or other security measures prior to permitting wireless connections from wireless device 112 and network client 116. If wireless device 112 is connected to network element 108, then transfer logic module 208 may permit a call transfer request from wireless device 112. A user of wireless device 112 may press a button, a function key, or other control to initiate a request of a transfer of a call currently on a landline (e.g., telephone 106) to wireless device 112. Transfer logic module 208 may permit the request based upon the authentication.

According to some embodiments, transfer logic module 208 may contain or access storage (e.g., one or more databases of call routing rules, user preferences, known callers, user mobile device information, etc.) Transfer logic module 208 may also receive information about a call on a landline. For example, transfer logic module 208 may receive call information from one or more of: caller id, calling line identification, calling number identification, and automatic number identification. Transfer logic module 208 may contain or access rules and mapping information to determine whether a call associated with certain call information should be transferred to a mobile device. For example, a phone number of a caller on a landline based call may be used to query a table or other data structure to determine whether the caller should be transferred to a mobile device. A user may specify that calls meeting certain conditions (e.g., originating from one or more specified numbers or area codes) are to be transferred to a mobile device. Other rules may include applying schedules to determine if a call should be transferred to a mobile device at a specified time or if it should be allowed to remain on a landline.

According to some embodiments, transfer logic module 208 may determine whether a transfer request received from a mobile device should be permitted (e.g., a user may not permit a child to receive call transfers to a mobile device during certain hours). According to some embodiments, transfer logic module 208 may initiate a call transfer from a landline to a mobile device without receiving a request from the mobile device. For example, a user may specify work hours during which calls from specified numbers to a home landline may be transferred to a mobile device (e.g., a user's cell phone at their office). According to some embodiments, other conditions may be detected and used to determine whether a call should be transferred. For example, if a landline has call waiting and is currently in use, a second call may be transferred to a mobile device. According to some embodiments, transfer logic module may receive information about a mobile device and may use this information to determine whether to transfer a call. If a mobile device is currently connected to a network device (e.g., network element 108) then it may be determined that the mobile device is active and available for a call transfer.

According to some embodiments, a mobile device may be polled, queried, or prompted by transfer logic module 208. For example, network client 116 may be polled to determine whether a VOIP application is available and running. Transfer logic module 208 may send a notification to a user of a mobile device prompting them about a current landline call. For example, transfer logic module 208 may send a notification via WiFi, bluetooth, or another protocol to a wireless device. A notification may contain call information (e.g., a caller name and number) and may prompt a user to inquire whether they desire to transfer the call to the mobile device. According to some embodiments, MMS, SMS, email, or other messaging protocols may be used to provide a notification. A user of a mobile device may be able to respond to a notification using a same protocol to initiate a transfer of the landline based call to their mobile device.

Configuration and reporting module 210 may provide a user interface allowing configuration of call transfer management. Configuration and reporting module 210 may allow a user to provide a mapping of incoming calls to mobile devices using one or more of caller names, caller numbers, destination device numbers, destination device network addresses, and destination device ids. Configuration and reporting module 210 may allow a user to provide a schedule for permissible or impermissible call transfers (e.g., allowing or initiating the transfer of a call from a specified caller to a specified mobile device at certain times of the week and times of the day). Configuration and reporting module 210 may allow a user to specify one or more rules (e.g., transfer calls from a certain area code to a certain mobile device or do not permit the transfer of calls with blocked caller id information). Configuration and reporting module 210 may allow a user to add or remove devices that are permitted to transmit requests for call transfers and devices that are permitted to accept call transfers. According to one or more embodiments, configuration and reporting module 210 may generate logs of transferred calls, call transfer requests, and errors. Configuration and reporting module 210 may provide an interface that is accessible via a network for configuration, reporting, wireless authentication and security configuration, error notification and other call transfer management functionality. For example, a user may remotely access configuration and reporting module 210 via a wireless or wired connection and may be provided with one or more web pages or other GUI interfaces for management functionality.

Figure 3:
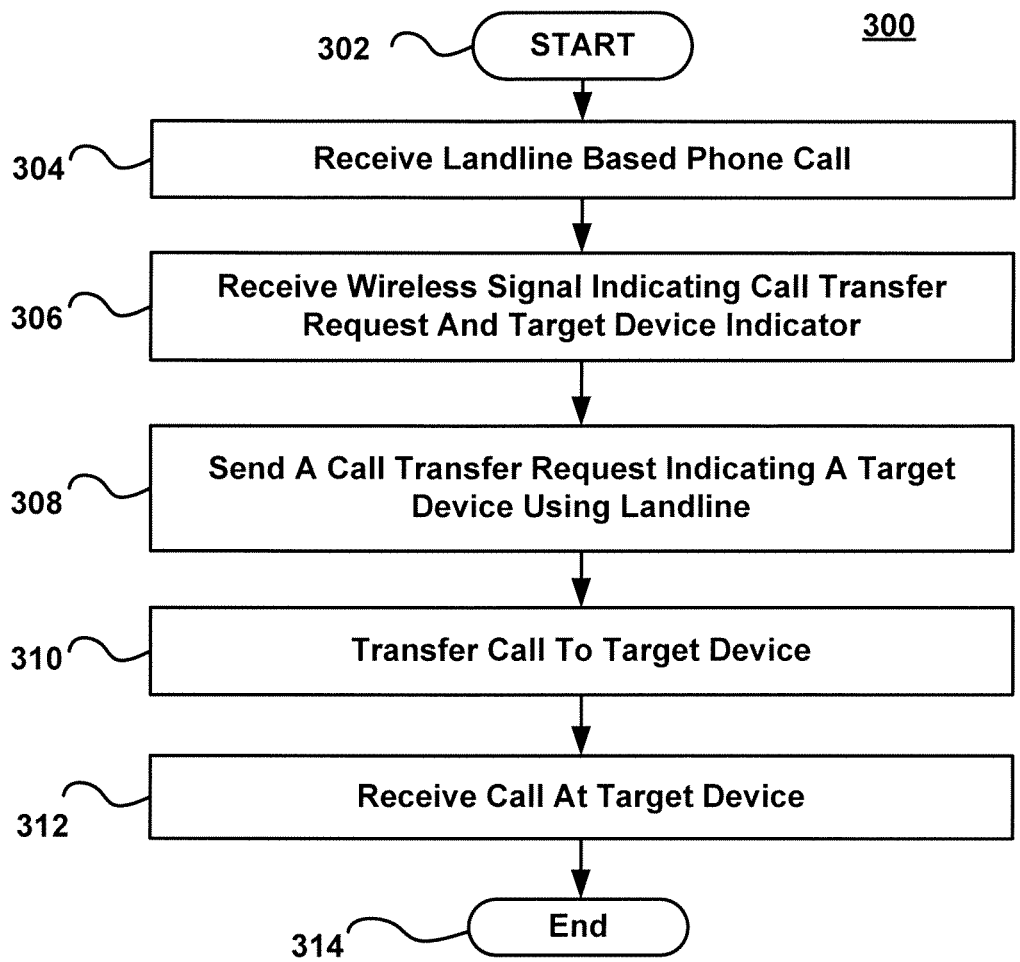
FIG. 3 depicts a method for call transfer management, according to a particular embodiment.

FIG. 3 depicts a method for call transfer management, according to a particular embodiment. At block 302, the method 300 for call transfer management may begin. At block 304, a call may be received at a landline. For example, telephone 106 of FIG. 1 may receive a call.

At block 306 a wireless signal may be received indicating a call transfer request. For example, referring to FIG. 1, network element 108 may receive a signal containing a call transfer request via a wireless connection from wireless device 112 or network client 116. According to some embodiments, the call transfer request may contain an identifier of a target mobile device for the transfer (e.g., one or more of: a calling phone number, a caller name, a called name, a called number, an IP address, a MAC id, and a connection id). According to some embodiments, a recipient of a call transfer request (e.g., network element 108) may identify a target device via a connection used to send the transfer request. For example, network element 108 may determine that wireless device 116 is the intended call transfer target or destination based on a request transmitted over an authenticated wireless connection from wireless device 116.

According to some embodiments, it may be assumed that the call transfer request is for a call on a landline connected to a device receiving the call transfer request. For example, a user of wireless device 112 may press a button, issue a voice command, or provide other input requesting a transfer. Wireless device 112 may be connected to network element 108. According to some embodiments, network element 108 may identify wireless device 112 by a parameter in the request or by an attribute of the wireless connection to wireless device 112. In one or more embodiments, network element 108 may be configured to assume the transfer request is for a call presently on a landline connected to network element 108 (e.g., a call on phone 106).

According to one or more embodiments, a device receiving a call transfer request may apply one or more mapping rules to identify a call to be transferred. For example, if there are multiple landlines or call waiting and a transfer requesting a mobile device is only permitted to transfer calls from one of the callers then a call for that caller may be transferred. In configurations supporting multiple landlines identification of a call to be transferred may be requested or required.

Returning to FIG. 3, at block 308, a call transfer request may be sent using a landline. For example, network element 108 of FIG. 1 may send a call transfer request to network element 104 (e.g., a switch at a central office). The call transfer request may identify a call to be transferred or it may be assumed that the call is a call on the landline sending the transfer request. The call transfer request may also identify a transfer or target destination (e.g., a phone number or network address of a mobile device). If a call transfer has been requested by a user of a mobile device who is presently also engaged in the call on the landline, the user may hang up or terminate the call on the landline after submitting the request. According to one or more embodiments, after a call transfer request has been received and submitted to a switch, a confirmation tone on the landline, a light on network element 108, or another confirmation indicator may be provided indicating that the transfer request has been sent to the switch. Confirmation indicators may also be provided on a mobile device requesting a transfer. The confirmation indicator may notify the user that it is safe to terminate the landline call and wait for the call on the specified mobile device.

At block 310, the call may be transferred to the mobile device.

At block 312, the call may be received at the mobile device.

At block 314, the method 300 may end.

Figure 4:
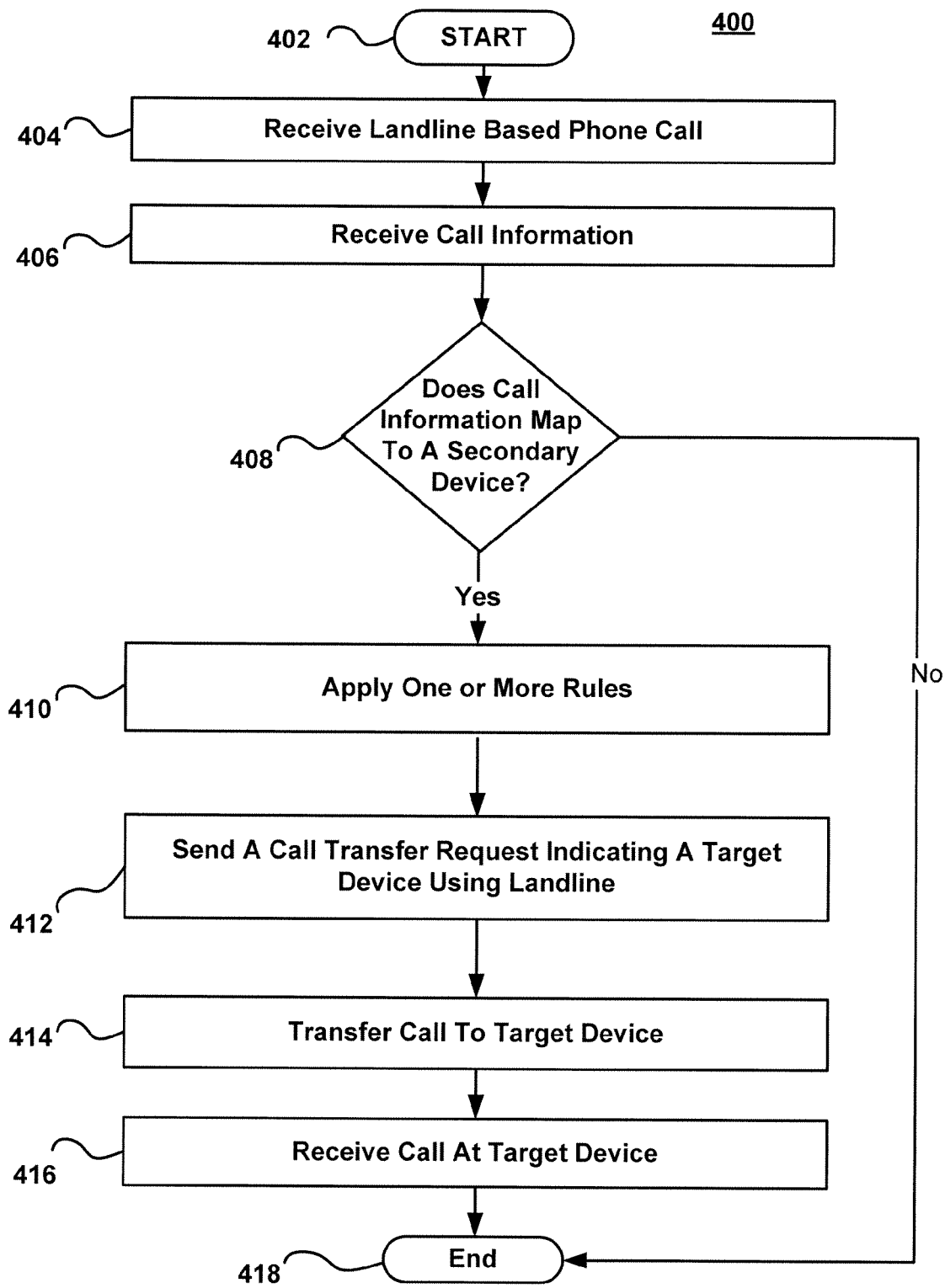
FIG. 4 depicts a method for call transfer management using call information, according to a particular embodiment.

FIG. 4 depicts a method for call transfer management using call information, according to a particular embodiment. At block 402, the method 400 for call transfer management may begin.

At block 404, a call may be received at a landline. For example, telephone 106 of FIG. 1 may receive a call.

At block 406 a device connected to a landline (e.g., network element 108) may receive call information from one or more of: caller id, calling line identification, calling number identification, and automatic number identification.

At block 408, it may be determined whether information associated with a landline call maps the landline call to a secondary device. For example, a phone number of a caller on a landline based call may be used to query a table or other data structure to determine whether the caller should be transferred to a mobile device. According to some embodiments, if mapping is not found associating the landline call information with a target secondary or mobile device, the method may end at block 418. If an association or mapping is found associating the landline call information with a target secondary or mobile device, the method may continue at block 410.

At block 410, one or more rules may be applied to determine whether a call should be transferred and how it should be transferred. For example, rules may specify that calls meeting certain conditions (e.g., originating from one or more specified numbers or area codes) are to be transferred to a mobile device. Other rules may include applying schedules to determine if a call should be transferred to a mobile device at a specified time or if it should be allowed to remain on a landline (e.g., a user may not permit a child to receive call transfers to a mobile device during certain hours). As another example, a user may specify work hours during which calls from specified numbers to a home landline may be transferred automatically to a mobile device (e.g., a user's cell phone at their office). According to some embodiments, other conditions may be detected and used to determine whether a call should be transferred. For example, if a landline has call waiting and is currently in use, a second call may be transferred to a mobile device. According to some embodiments, information about a mobile device may be used to determine whether to transfer a call. For example, if a mobile device is currently connected to a network device (e.g., network element 108) then it may be determined that the mobile device is active and available for a call transfer.

At block 412, a call transfer request may be sent using a landline. For example, network element 108 may send a call transfer request to network element 104 (e.g., a switch at a central office). The call transfer request may identify a call to be transferred or it may be assumed that the call is a call on the landline sending the transfer request. The call transfer request may also identify a transfer or target destination (e.g., a phone number or network address of a mobile device).

At block 414, the call may be transferred to the mobile device.

At block 416, the call may be received at the mobile device.

At block 418, the method may end.

Figure 5:
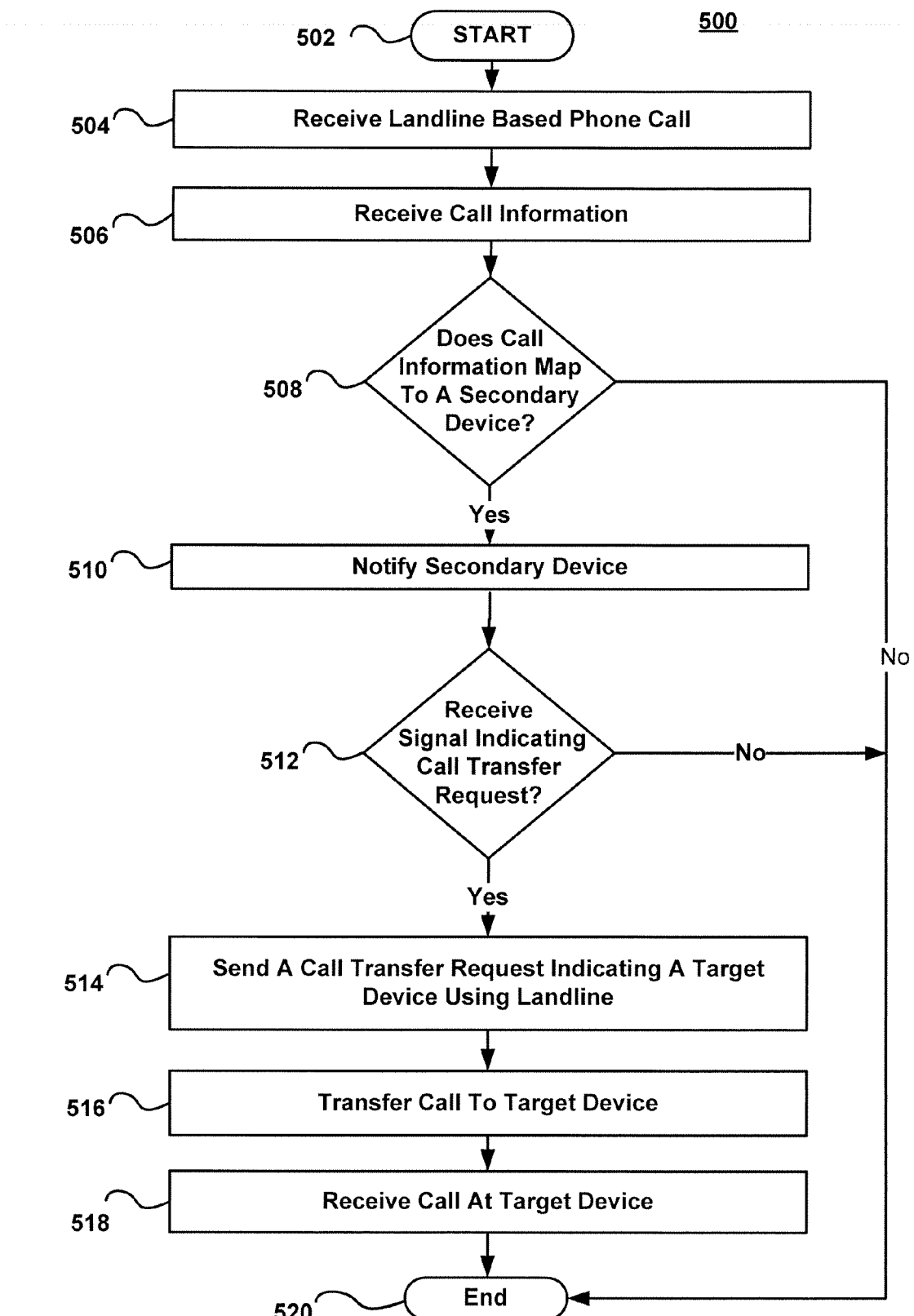
FIG. 5 depicts a method for call transfer management including notifying a potential target device, according to a particular embodiment.

FIG. 5 depicts a method for call transfer management including notifying a potential target device, according to a particular embodiment. At block 502, the method 500 for call transfer management may begin.

At block 504, a call may be received at a landline. For example, telephone 106 of FIG. 1 may receive a call.

At block 506 a device connected to a landline (e.g., network element 108) may receive call information from one or more of: caller id, calling line identification, calling number identification, and automatic number identification.

At block 508, it may be determined whether information associated with a landline call maps the landline call to a secondary device. For example, a phone number of a caller on a landline based call may be used to query a table or other data structure to determine whether the caller should be transferred to a mobile device. According to some embodiments, if mapping is not found associating the landline call information with a target secondary or mobile device, the method may end at block 518. If an association or mapping is found associating the landline call information with a target secondary or mobile device, the method may continue at block 410.

At block 510, the secondary device may be notified. For example, a notification may be sent to a user of a mobile device prompting them about a current landline call. According to some embodiments, the notification may be sent via WiFi, bluetooth, or another protocol to a wireless device. A notification may contain call information (e.g., a caller name and number) and may prompt a user to inquire whether they desire to transfer the call to the mobile device. According to some embodiments, MMS, SMS, email, or other messaging protocols may be used to provide a notification. A user of a mobile device may be able to respond to a notification using a same or different protocol to initiate a transfer of the landline based call to their mobile device.

At block 512 it may be determined whether a response indicating a call transfer request has been received. If a response requesting a call transfer request has been received, the method 500 may continue at block 514. If a response declining a call transfer request has been received, if the call has terminated, or if a timeout period has expired, the method 500 may end at block 520.

At block 514, a call transfer request may be sent using a landline. For example, network element 108 may send a call transfer request to network element 104 (e.g., a switch at a central office). The call transfer request may identify a call to be transferred or it may be assumed that the call is a call on the landline sending the transfer request. The call transfer request may also identify a transfer or target destination (e.g., a phone number or network address of a mobile device).

At block 516, the call may be transferred to the mobile device.

At block 518, the call may be received at the mobile device.

At block 520, the method may end.

It is further noted that the software described herein may be tangibly embodied in one or more physical media, such as, but not limited to, a compact disc (CD), a digital versatile disc (DVD), a floppy disk, a hard drive, read only memory (ROM), random access memory (RAM), as well as other physical media capable of storing software, or combinations thereof. Moreover, the figures illustrate various components (e.g., servers, computers, etc.) separately. The functions described as being performed at various components may be performed at other components, and the various components may be combined or separated. Other modifications also may be made.

In the preceding specification, various preferred embodiments have been described with references to the accompanying drawings. It will, however, be evident that various modifications and changes may be made thereto, and additional embodiments may be implemented, without departing from the broader scope of invention as set forth in the claims that follow. The specification and drawings are accordingly to be regarded in an illustrative rather than restrictive sense.

We claim:

1. A computer-implemented method, comprising:
   receiving a phone call over a landline;
   receiving, using a device connected to the landline, a wireless signal from a mobile device indicating a call transfer request, wherein the call transfer request comprises a request to transfer the phone call from the landline to the mobile device, wherein the call transfer request contains a mobile device indicator;
   determining, using the device connected to the landline, that the phone call over the landline will be transferred to the mobile device, wherein a determination that the phone call over the landline will be transferred to the mobile device is based at least in part on the receipt of the call transfer request from the mobile device;
   sending, from the device connected to the landline, the call transfer request over the landline, wherein the call transfer request contains a mobile device indicator of the mobile device; and
   transferring the phone call from the landline to the mobile device.

2. The method of claim 1, wherein the wireless signal received from the mobile device is initiated by a module on the mobile device in response to user input.

3. The method of claim 1, further comprising notifying the mobile device of the phone call on the landline.

4. The method of claim 1, wherein the wireless signal comprises at least one of a WiFi based signal, a bluetooth based signal, and a ZigBee based signal.

5. The method of claim 1, wherein the mobile device comprises at least one of: a cell phone, a laptop, a personal digital assistant, or a gaming device.

6. The method of claim 1, wherein transferring the phone call from the landline to the mobile device comprises establishing a cell phone call to the mobile device.

7. The method of claim 1, wherein transferring the phone call from the landline to the mobile device comprises establishing a VOIP call over a broadband network to the mobile device.

8. The method of claim 1, wherein transferring the phone call from the landline to the mobile device comprises establishing a call to a second landline based phone.

9. The method of claim 1, further comprising:
   receiving, at the device connected to the landline, call information; and
   mapping call information to a mobile device, wherein the determination is made at least in part on the mapping.

10. The method of claim 9, wherein the call information comprises one or more of:
    caller id, calling line identification, calling number identification, or automatic number identification.

11. The method of claim 9, further comprising:
    applying one or more rules as part of the determination.

12. The method of claim 11, wherein the determination is based at least in part on one or more of: a time a call is received, a calling party, a user specified preference, detection of a connection of the mobile device to the device connected to the landline, or a response from a poll of a mobile device by the device connected to the landline.

13. The method of claim 1, further comprising:
    providing a user interface for management of call transfer logic.

14. The method of claim 13, wherein management of call transfer logic comprises at least one of: editing one or more rules, determining when to transfer a call; editing a mapping of incoming call information to target mobile devices, or editing a schedule indicating when calls will be transferred.

15. The method of claim 1, wherein the mobile device indicator comprises at least one of: a telephone number, a MAC address, or an IP address.

16. A non-transitory computer readable storage medium comprising code to perform the method of claim 1.

17. A system, comprising:
a network element connected to a landline, wherein the network element comprises one or more processors configured to:
receive a phone call over the landline;
receive a wireless signal from a mobile device indicating a call transfer request, wherein the call transfer request comprises a request to transfer the phone call from the landline to the mobile device, wherein the call transfer request contains a mobile device indicator;
determine that the phone call over the landline will be transferred to the mobile device, wherein a determination that the phone call over the landline will be transferred to the mobile device is based at least in part on the receipt of the call transfer request from the mobile device;
send the call transfer request over the landline, wherein the call transfer request contains a mobile device indicator of the mobile device; and
transfer the phone call from the landline to the mobile device.

18. A computer program product comprising a non-transitory computer-readable storage medium having computer-readable instructions stored therein, wherein the computer-readable instructions are configured to be readable from the non-transitory computer-readable storage medium by at least one computer processor and thereby cause the at least one computer processor to operate so as to:
receive a phone call over a landline;
receive a wireless signal from a mobile device indicating a call transfer request wherein the call transfer request comprises a request to transfer the phone call from the landline to the mobile device, wherein the call transfer request contains a mobile device indicator;
determine that the phone call over the landline will be transferred to the mobile device, wherein a determination that the phone call over the landline will be transferred to the mobile device is based at least in part on the receipt of the call transfer request from the mobile device;
send the call transfer request over the landline, wherein the call transfer request contains a mobile device indicator of the mobile device; and
transfer the phone call from the landline to the mobile device.

19. The computer program product of claim 18, wherein the wireless signal comprises at least one of a WiFi based signal, a bluetooth based signal, or a ZigBee based signal.

20. The computer program product of claim 18, wherein the instructions are further configured to cause the at least one computer processor to operate so as to:
receive call information; and
map call information to a mobile device, wherein the determination is made at least in part on the mapping.

* * * * *